(12) United States Patent
Fransson et al.

(10) Patent No.: US 12,116,725 B2
(45) Date of Patent: Oct. 15, 2024

(54) CLEANING HEAD WITH DIRECTIONAL NOZZLE ASSEMBLY AND SHAPED EXTERNAL AIR KNIFE FOR TRAVERSING SHOWER SYSTEMS

(71) Applicant: Kadant Nordic AB, Huskvarna (SE)

(72) Inventors: Jan Fransson, Gränna (SE); Werner Raschka, Neuss (DE)

(73) Assignee: Kadant Nordic AB, Huskvarna (SE)

( * ) Notice: Subject to any disclaimer, the term of this patent is extended or adjusted under 35 U.S.C. 154(b) by 745 days.

(21) Appl. No.: 17/174,774

(22) Filed: Feb. 12, 2021

(65) Prior Publication Data

US 2021/0254270 A1 Aug. 19, 2021

Related U.S. Application Data

(60) Provisional application No. 62/975,990, filed on Feb. 13, 2020.

(51) Int. Cl.
*D06G 1/00* (2006.01)
*B05B 1/18* (2006.01)
(Continued)

(52) U.S. Cl.
CPC .............. *D06G 1/00* (2013.01); *B05B 1/18* (2013.01); *B05B 1/267* (2013.01); *B05B 15/62* (2018.02); *B08B 3/024* (2013.01); *B08B 5/02* (2013.01); *B08B 5/046* (2013.01); *B65H 20/00* (2013.01); *B65H 2301/5115* (2013.01); *D10B 2505/00* (2013.01)

(58) Field of Classification Search
CPC .. D06G 1/00; B05B 1/18; B05B 1/267; B05B 15/62; B05B 1/005; B05B 1/14; B05B 13/0473; B08B 3/024; B08B 5/02; B08B 5/046; B08B 3/022; B08B 15/04; B65H 20/00; B65H 2301/5115; D10B 2505/00; B65G 45/22; D21B 1/021
USPC ... 134/198, 122 R, 15, 148, 172, 199, 21, 9, 134/95.3, 64 R; 198/494, 495, 493
See application file for complete search history.

(56) References Cited

U.S. PATENT DOCUMENTS 3,737,940 A * 6/1973 Moestue ................. B41F 35/02
15/312.1
4,073,030 A * 2/1978 Albishausen ........... A47L 11/34
15/322

(Continued)

FOREIGN PATENT DOCUMENTS

DE 4310470 C1 1/1994
DE 212005000002 U1 * 3/2006 ............. B08B 3/022
(Continued)

OTHER PUBLICATIONS

Machine translation of DE-212005000003-U1 (Year: 2006).*
(Continued)

*Primary Examiner* — David G Cormier
*Assistant Examiner* — Thomas Bucci
(74) *Attorney, Agent, or Firm* — Gesmer Updegrove LLP

(57) ABSTRACT

A cleaning head is disclosed for use in a traversing shower system. The cleaning head includes a plurality of directional fluid nozzles for discharging a fluid, each of which is provided along a different direction toward a work surface such that no two directions cross one another between the cleaning head and a working surface.

26 Claims, 11 Drawing Sheets

(51) Int. Cl.
  *B05B 1/26* (2006.01)
  *B05B 15/62* (2018.01)
  *B08B 3/02* (2006.01)
  *B08B 5/02* (2006.01)
  *B08B 5/04* (2006.01)
  *B65H 20/00* (2006.01)

(56) References Cited

U.S. PATENT DOCUMENTS

| | | | | |
|---|---|---|---|---|
| 5,379,695 | A * | 1/1995 | Rieth | B08B 3/024 101/424 |
| 5,603,775 | A * | 2/1997 | Sjoberg | D21F 1/325 15/345 |
| 5,783,044 | A * | 7/1998 | Schneider | D21F 1/325 162/278 |
| 5,964,956 | A * | 10/1999 | Straub | D21F 1/325 15/309.1 |
| 5,964,960 | A * | 10/1999 | Boeck | B08B 3/022 162/278 |
| 6,050,392 | A * | 4/2000 | Straub | B65G 45/22 198/495 |
| 6,051,076 | A * | 4/2000 | Oechsle | D21F 1/32 15/302 |
| 6,360,758 | B1 * | 3/2002 | Eivola | D21F 1/325 162/275 |
| 7,044,287 | B1 * | 5/2006 | Gray | B65G 45/22 198/494 |
| 2003/0094255 | A1 * | 5/2003 | Bartelmuss | D21F 1/32 162/275 |
| 2009/0083931 | A1 * | 4/2009 | Harris | B08B 3/022 15/302 |
| 2009/0208654 | A1 * | 8/2009 | MacFarlane | B08B 5/04 427/299 |
| 2011/0220147 | A1 * | 9/2011 | Schreiber | B08B 1/32 134/95.2 |
| 2012/0006357 | A1 * | 1/2012 | Caspar | A47L 11/4097 134/109 |
| 2012/0067382 | A1 * | 3/2012 | Berntsen | B08B 5/023 134/61 |
| 2012/0318472 | A1 * | 12/2012 | Caspar | D21F 1/32 134/122 R |
| 2020/0340181 | A1 * | 10/2020 | Sekiya | D21F 7/12 |

FOREIGN PATENT DOCUMENTS

| | | | | |
|---|---|---|---|---|
| DE | 212005000003 U1 * | 3/2006 | | B08B 3/022 |
| DE | 102007028341 A1 * | 12/2008 | | B08B 1/008 |
| EP | 1884588 A2 * | 2/2008 | | D21F 1/32 |
| WO | 2006045574 A1 | 5/2006 | | |
| WO | WO-2008151814 A1 * | 12/2008 | | B08B 1/008 |

OTHER PUBLICATIONS

Machine translation of DE-212005000002-U1 (Year: 2006).*
Communication pursuant to Rules 161(1) and 162 EPC issued by the European Patent Office in related European Patent Application No. 21711083.2 on Sep. 20, 2022, 3 pages.
Notification Concerning Transmittal of International International Preliminary Report on Patentability, and the International Preliminary Report on Patentability, issued by the International Bureau of WIPO in related International Application No. PCT/US2021/017864 on Aug. 25, 2022, 14 pages.
Notification of Transmittal of the International Search Report and The Written Opinion of the International Searching Authority, or the Declaration, International Search Report and Written Opinion of the International Searching Authority issued in related International Application No. PCT/US2021/017864 on Jun. 25, 2021, 20 pages.
Communication pursuant to Article 94(3) EPC issued by the European Patent Office in related European Patent Application No. 21711083.2 on Nov. 14, 2023, 6 pages.

* cited by examiner

DETAIL A

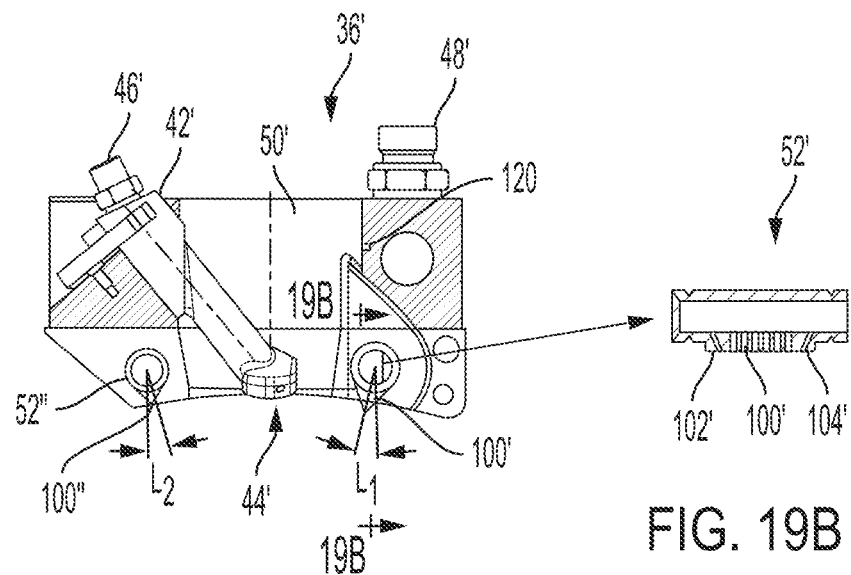
FIG. 19A
FIG. 19B
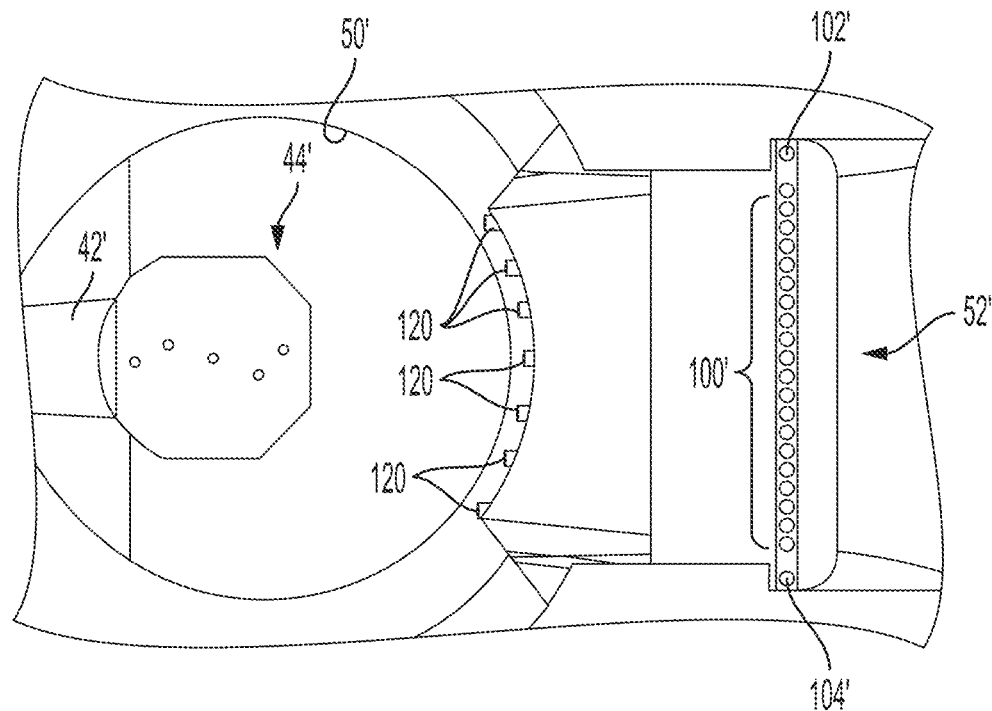
FIG. 20

CLEANING HEAD WITH DIRECTIONAL NOZZLE ASSEMBLY AND SHAPED EXTERNAL AIR KNIFE FOR TRAVERSING SHOWER SYSTEMS

PRIORITY

The present application claims priority to U.S. Provisional Patent Application Ser. No. 62/975,990 filed Feb. 13, 2020, the-disclosure of which is hereby incorporated by reference in its entirety.

BACKGROUND

The invention generally relates to cleaning head systems, and relates in particular to cleaning head systems for use in traversing shower systems.

Traversing shower systems may be used in a variety of industrial applications, including for example, papermaking, tissue making, fibre mat processing (e.g., glass fibre mat), as well as many further applications involving fabrics, clothing, and other belt applications, or rolls in similar industries and applications.

FIG. 1 shows a traversing shower beam 10 with a cleaning head 12. As a material 14, e.g., fabric, belt, mat or roll (shown in FIG. 2) moves under the beam 10 in a machine direction, the cleaning head 12 traverses the beam in the cross machine direction to clean the surface of the material 14. FIG. 2 shows a broken away portion of the cleaning head 12 that provides to the material high pressure water at an angle of about 45 degrees (as shown at 16) as well as forced air as shown at 18 and 20 at more shallow opposing angles, as well as at 22 at an angle more normal to the surface of the material. Vacuum in provided via channels 24, 26, 28. The cleaning head applies the pressurized water and air, as well as the vacuum to loosen and remove debris from the material.

There remains a need however for more efficient and more economical cleaning systems for use in traversing shower systems.

SUMMARY

In accordance with an aspect, the invention provides a cleaning head for use in a traversing shower system, the cleaning head including a plurality of directional fluid nozzles for discharging a fluid, each of which is provided along a different direction toward a work surface such that no two directions cross one another between the cleaning head and a working surface.

In accordance with another aspect, the invention provides a cleaning head for use in a traversing shower system, the cleaning head including a central unit including a central aperture through which vacuum is provided to draw liquid and debris from a working surface, at least one forced air nozzle for providing forced air onto the working surface proximate the central aperture, and a liquid applicator assembly that extends into the central aperture, said liquid applicator assembly including plurality of directional liquid nozzles for discharging liquid onto the working surface from at least two different directions.

In accordance with a further aspect, the invention provides a cleaning head for use in a traversing shower system, the cleaning head including a central unit through which forced air and forced liquid are provided to a working surface, and through which a vacuum is provided from the working surface to draw fluid and debris from the working surface, and an extension arm extending from the central unit and including an external air knife assembly that includes a plurality of air knife nozzles in a pattern that widens in a machine direction of the working surface.

BRIEF DESCRIPTION OF THE DRAWINGS

The following description may be further understood with reference to the accompanying drawings in which:

FIG. 19A shows an illustrative diagrammatic view side sectional view similar to that of FIG. 9 of a cleaning head that includes vacuum chamber lubricant nozzles in accordance with another aspect of the present invention;

FIG. 19B shows an illustrative front sectional view of the gas applicator assembly taken along line 19B-19B of FIG. 19A;

FIG. 20 shows an illustrative diagrammatic enlarged view of the underside of a portion of the cleaning head of FIG. 19A;

The drawings are shown for illustrative purposes only.

DETAILED DESCRIPTION

In accordance with various aspects, the invention provides an improved cleaning head for a traversing shower system, and a method of using a cleaning head in a traversing shower system, that is used for cleaning machine materials (e.g., fabrics/clothing/belts) in for example, paper, tissue, non-woven, glass fibre mat etc. applications. Systems and methods of various aspects of the invention involve the use of fluid nozzles in particular directions and air doctor systems together with an improved vacuum flow passage for evacuation of water and contaminants, allowing for better cleaning result and machine clothing with less residual moisture remaining after the cleaning process, providing improved dryness.

Figure 1:
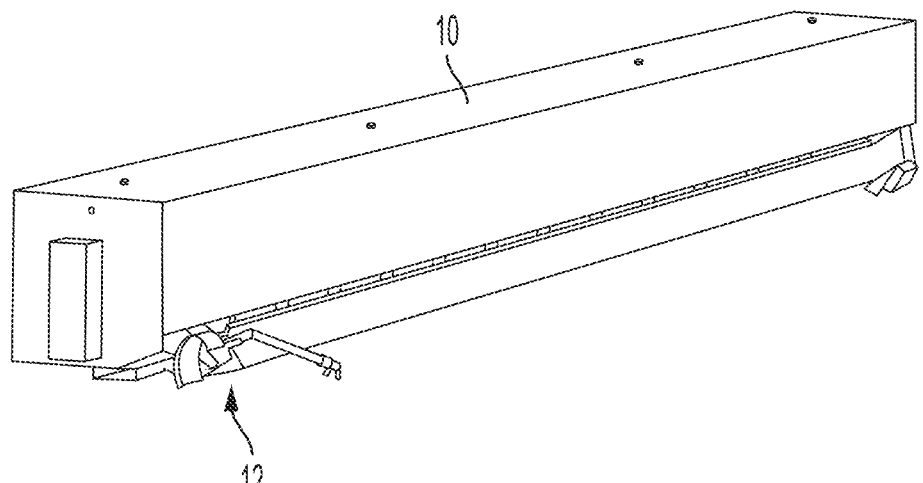
FIG. 1 shows an illustrative diagrammatic view of a traversing shower system of the prior art.
Figure 2:
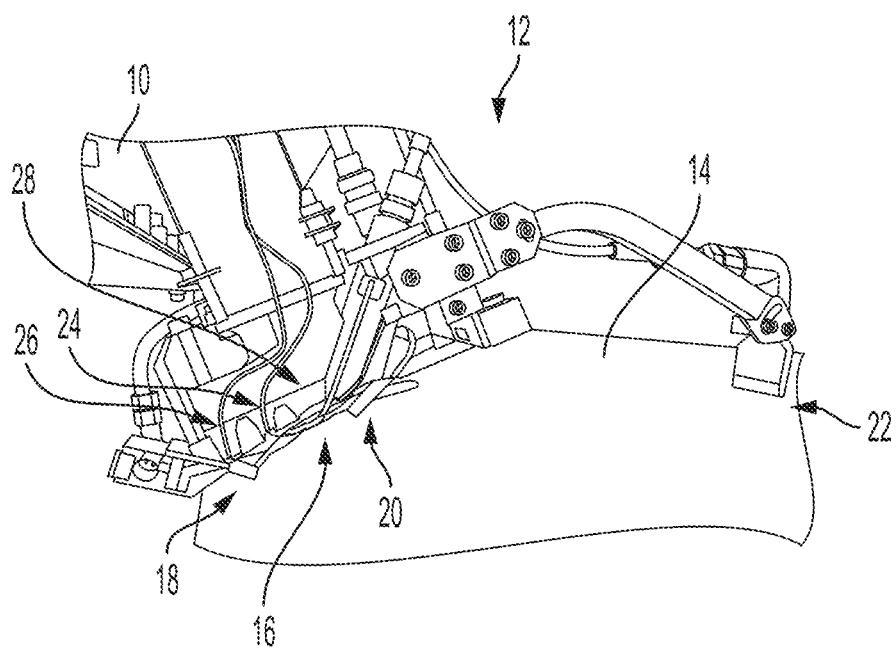
FIG. 2 shows an illustrative diagrammatic enlarged and broken-away view of the traversing shower system of FIG. 1.
Figure 3:
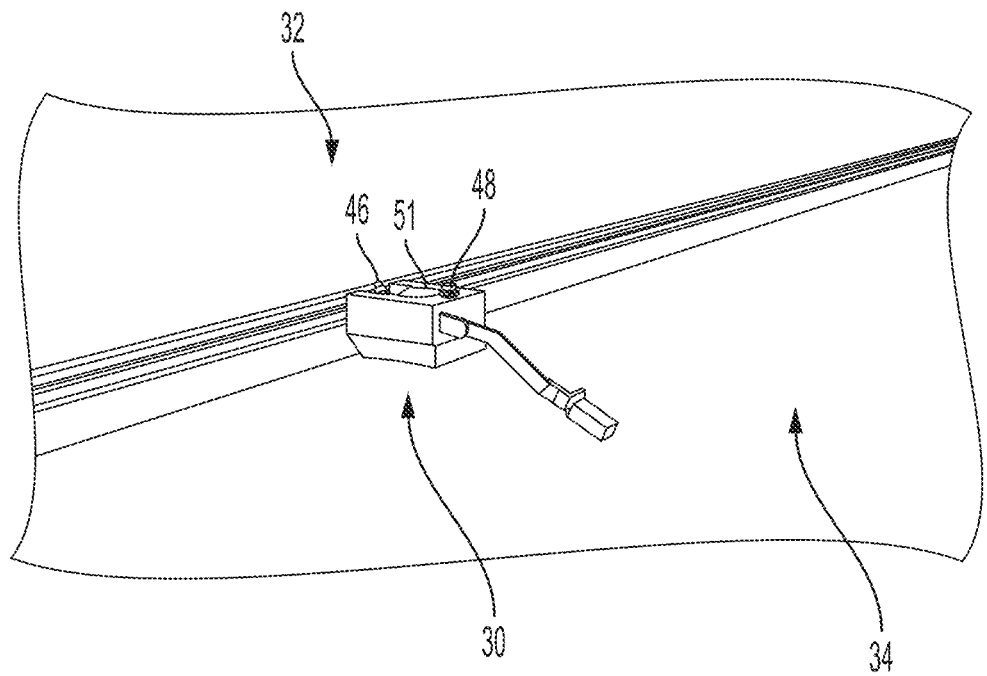
FIG. 3 shows an illustrative diagrammatic elevated isometric view of a traversing cleaning system employing a cleaning head in accordance with an aspect of the present invention.

A cleaning head in accordance with various aspects of the present invention is shown at 30, and may be mounted on a traversing beam 32 for movement above a roll material 34 being cleaned as shown in FIG. 3. The cleaning head 30 may include a central unit 36 and an external unit 38 mounted external to the central unit 36 as further shown in FIG. 4. Liquid may be provided at a fluid port 46, and air may be provided, at least in part, at a gas port 48, while vacuum may be provided at a vacuum chamber opening 51 (shown in FIG. 3). The fluid sources (e.g., water/chemicals and air/chemicals) as well as the vacuum source, may be provided via direct couplings or via couplings through the traversing beam 32.

Figure 4:
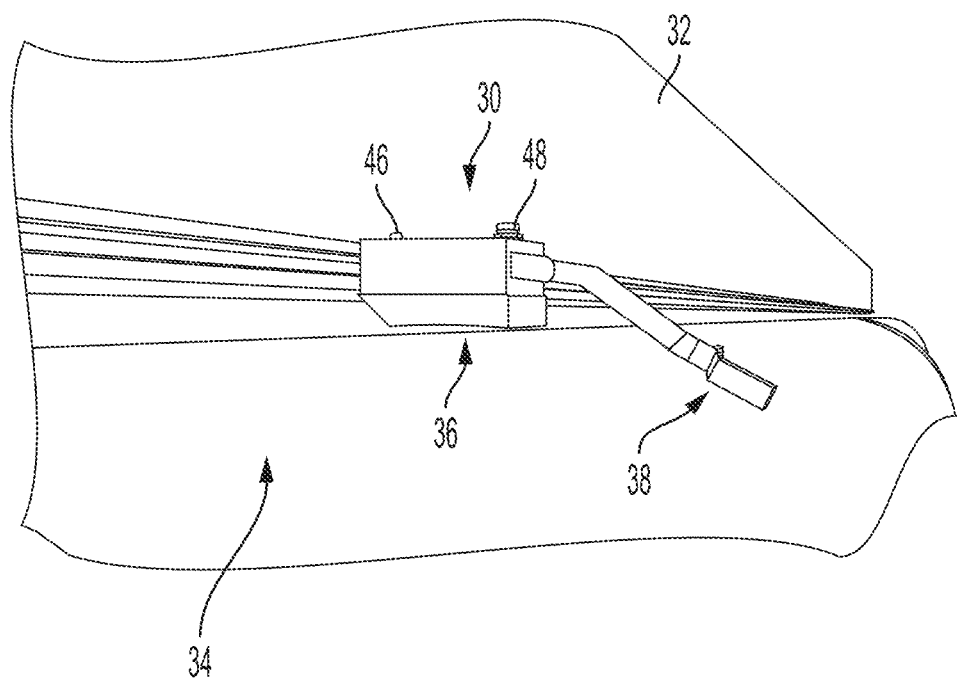
FIG. 4 shows an illustrative diagrammatic side isometric view of the system of FIG. 3.
Figure 5:
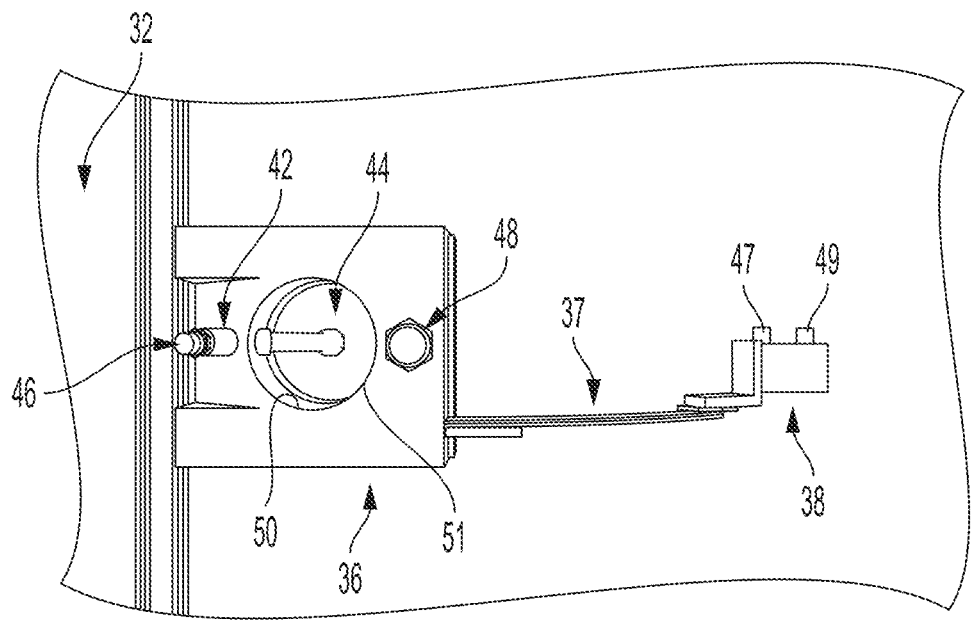
FIG. 5 shows an illustrative diagrammatic top view of the cleaning head of FIG. 3.
Figure 6:
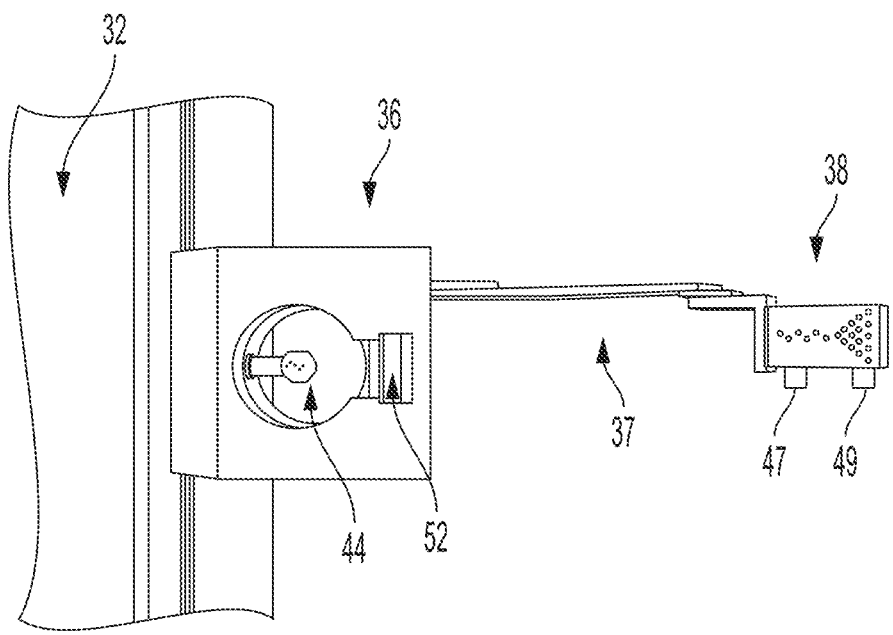
FIG. 6 shows an illustrative diagrammatic bottom view of the cleaning head of FIG. 3.

FIG. 5 shows a top view and FIG. 6 shows a bottom view of the cleaning head 30 of FIGS. 3 and 4. The cleaning head 30 in accordance with aspects of the invention includes a fluid applicator assembly 42 for providing fluid (e.g., liquid such as water or chemicals or a mix or water and chemicals) to a work surface 34. The fluid applicator assembly 42 includes a fluid applicator head 44 that includes a plurality of nozzle apertures, which are discussed in more detail below. The fluid applicator head 44 is coupled via the conduit 46 to the fluid applicator source as noted above. Gas under pressure is provided to a gas applicator assembly that includes a gas intake port 48 (shown in FIG. 5) and a central unit air knife assembly 52 that includes one or more rows of gas nozzles. The external unit 38 (e.g., knife edge unit) also includes a plurality of nozzle apertures (discussed in more detail below with reference to FIGS. 17 and 18), and is mounted to the central unit 36 by an arm 37. The arm 37 positions the external unit proximate (e.g., above) the material either on a roll or as the material is leaving the roll in the Machine Direction (MD). Gas under pressure is also provided to one or more ports 47, 49 of the external unit 38 from a source of pressurized gas.

Figure 7:
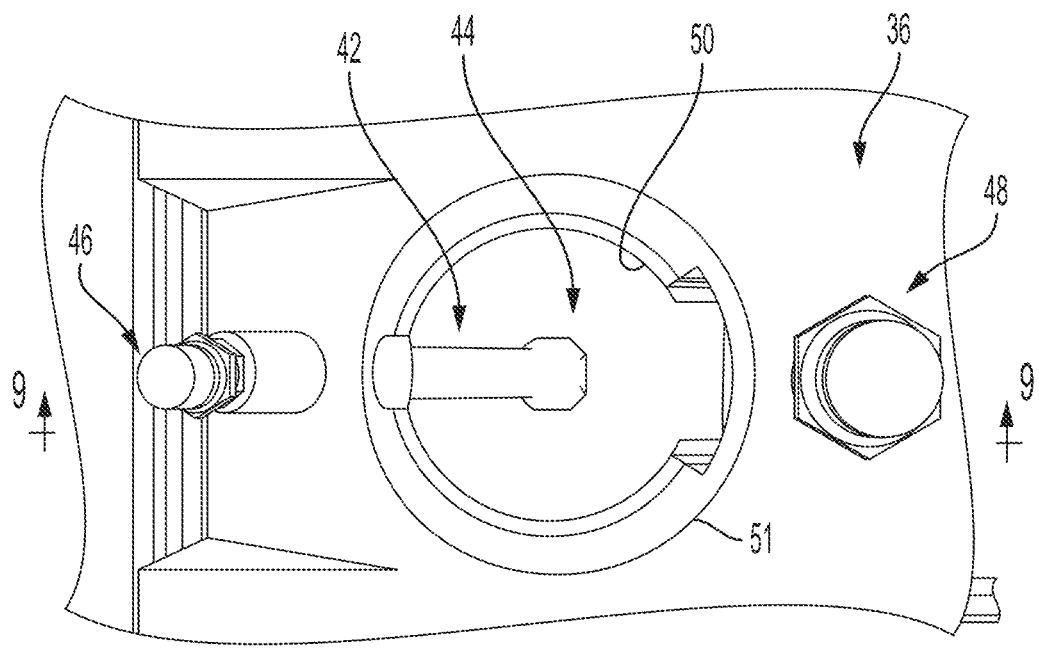
FIG. 7 shows an illustrative diagrammatic enlarged top view of a portion of the cleaning head of FIG. 3.
Figure 8:
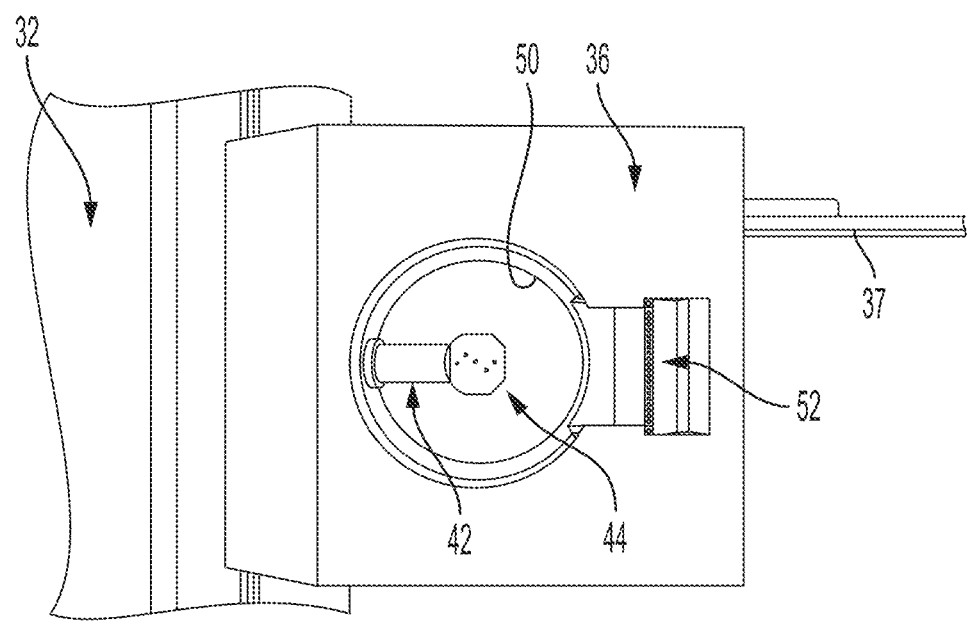
FIG. 8 shows an illustrative diagrammatic enlarged bottom view of a portion of the cleaning head of FIG. 3.

With reference to FIGS. 7 and 8 (showing enlarged top and bottom views of the central unit), the cleaning head 30 also includes the forced air conduit 48 coupled to a gas applicator source (including one or more rows of nozzles) for providing pressurized air to the work surface, as well as a vacuum source for providing vacuum to the work surface via vacuum passage 50 within the central unit 36. The fluid applicator head 44 of the central unit 36 includes a plurality of directional nozzles as discussed in further detail below. Pressurized air is provided to the work surface by a plurality of air nozzles 52 (e.g., in the form of an air knife). The cleaning head 30 provides an improvement over the prior cleaning heads as it has a new concept of nozzle directions and air doctor system together with an improved vacuum flow passage for evacuation of water and contaminants, allowing a better cleaning result and almost totally dry machine clothing.

Moreover, cleaning heads in accordance with various aspects will help to improve the machine runnability and prevent wet streaks in the end product. Such cleaning heads may be used in many other manufacturing processes where a contamination needs to be removed from any machine clothing, belt or roll. The cleaning head of various aspects of the invention provides a significantly different head with an optimized vacuum chamber and flow pattern together with an improved nozzle body and air knife in accordance with various aspects of the invention.

The inside shape of the cleaning head is designed to avoid dead spots and corners in order to achieve more uniform flow velocity throughout the flow channel. This also reduces turbulence and causes less contamination to stick on the inside surfaces of the cleaning head chamber. The transition from cleaning head vacuum to vacuum pipe is also virtually direct, providing straight vacuum flow in the cleaning head of aspects of the invention. The cleaning head 30 also includes an extension arm 37 onto which is provided an external Y-shaped air knife unit 38.

Figure 9:
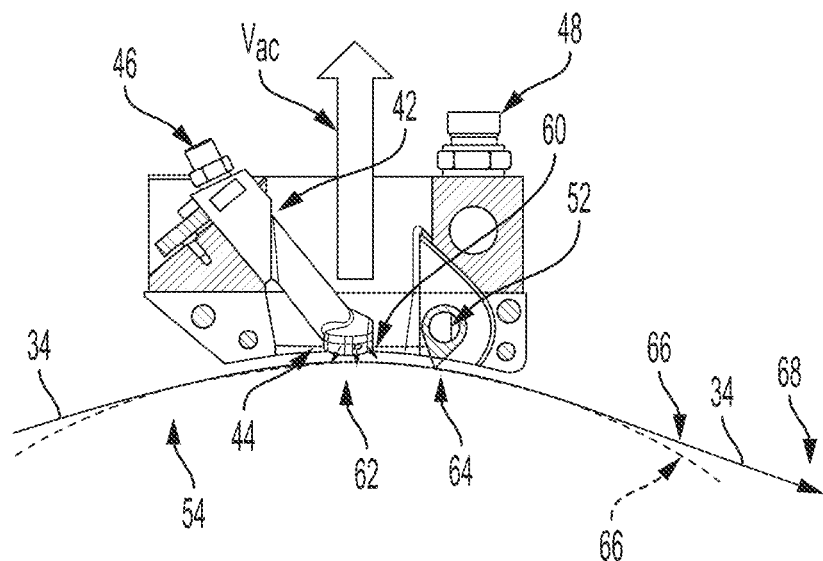
FIG. 9 shows an illustrative diagrammatic end sectional view of the cleaning head of FIG. 7 taken along line 9-9 thereof.

FIG. 9 shows a sectional view of the central unit of FIG. 7 taken along line 9-9 thereof. Fluid (e.g., water or water-based solutions) is provided via the fluid applicator head 44 of the fluid applicator assembly 42 to a work surface 34 as shown at 60 contacting the work surface at a concentrated area 62. The fluid applicator head 44 is positioned within the vacuum passage 50, and slightly above (e.g., 2, 2.5, 3 or up to 10 mm above the material). The positioning of the fluid applicator head 44 with respect to the work surface and the vacuum passage permits more efficient cleaning, particularly when combined with the application of air.

Figure 10:
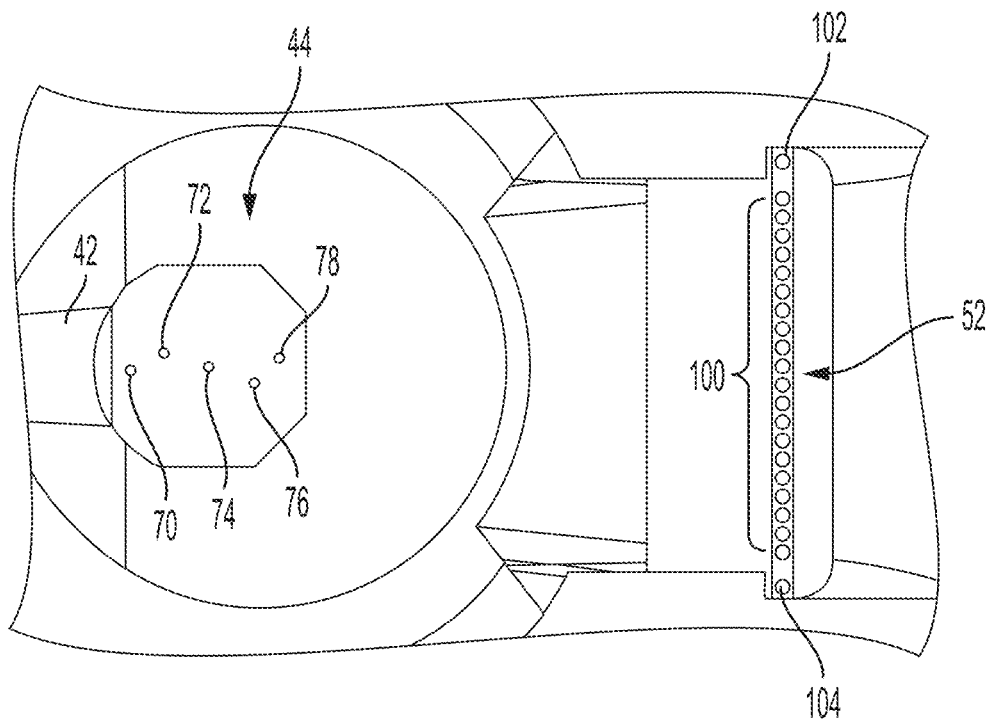
FIG. 10 shows an illustrative diagrammatic enlarged view of the underside of a portion of the cleaning head shown in FIG. 8.

In particular, air is provided (shown at 62 in FIG. 9) by air knife 52 using nozzles 100, 102, 104 as shown in FIG. 10. The plurality of nozzles 100 may be provided as directed perpendicular to the surface being cleaned, while the end nozzles 102, 104 may be angles that are directed inward toward the air flow from the nozzles 100 (as shown diagrammatically in FIG. 19B). Additional fluid (e.g., air) is provided by a source to the plurality of air knife nozzles 52 as shown at 64. The material 34 may be provided on a cylinder roll 54, and may leave the roll (as shown at 66) after moving past the traversing shower head 30. The external unit 38 (discussed above with reference to FIGS. 3-6) that is mounted on arm 37 may be positioned with either over the work surface 34 while the material is still on the roll 54, may be positioned over the work surface as the material leaves the roll (as shown at 66), or may be positioned over the work surface after the material has left the roll (as shown at 68), again, above the work surface of the material.

The fluid applicator assembly head 44 on which the directional fluid nozzles are provided is designed to optimize the impact of energy to the cleaning surface. Each spot of the fabric will be cleaned from all directions. The jet impact area is minimized during each moment of cleaning in order to keep the wetted area as small as possible. This increases the removal of water and dirt after cleaning. The fluid conduit body is also designed to reduce losses of vacuum flow and preventing the tendency to build up contaminants. The end of the fluid conduit body designed with angled surfaces to achieve the optimum nozzle angles and nozzle positions as shown in FIGS. 11-16.

The nozzles of the fluid applicator head 44 are designed to provide fluid (e.g., water) onto the work surface along a small section in the Cross Machine Direction (CMD), where the jet nozzles provide fluid from different angular directions. The impingement points on the work surface are shown at 90, 92, 94, 96, 98 in FIG. 15, and the varied angular impingement is provided by directional nozzles 80, 82, 84, 86, 88 (shown in FIG. 11). The fluid applicator head 44 extends into the vacuum passage 50, and may be centrally located within the passage 50, a short distance away from the work surface as noted above. The underside of the fluid applicator head 44 includes nozzle apertures 70, 72, 74, 76, 78 as shown in FIG. 10.

Figure 11:
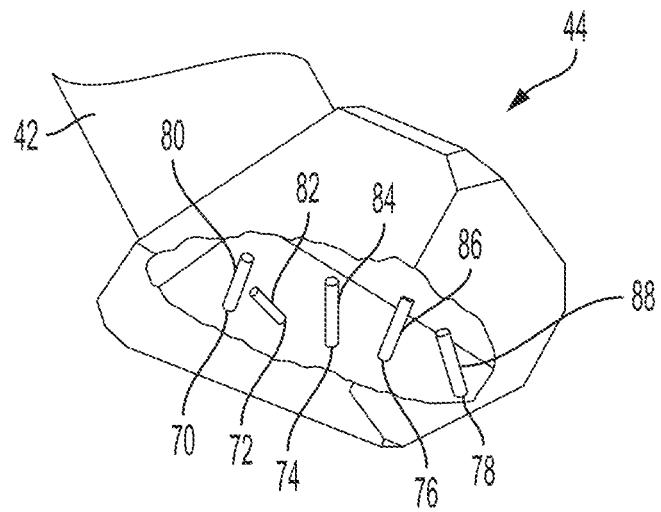
FIG. 11 shows an illustrative diagrammatic isometric view of a portion of the liquid applicator assembly of the cleaning head of FIG. 3 with a portion of the housing removed showing liquid applicator nozzles.
Figure 12:
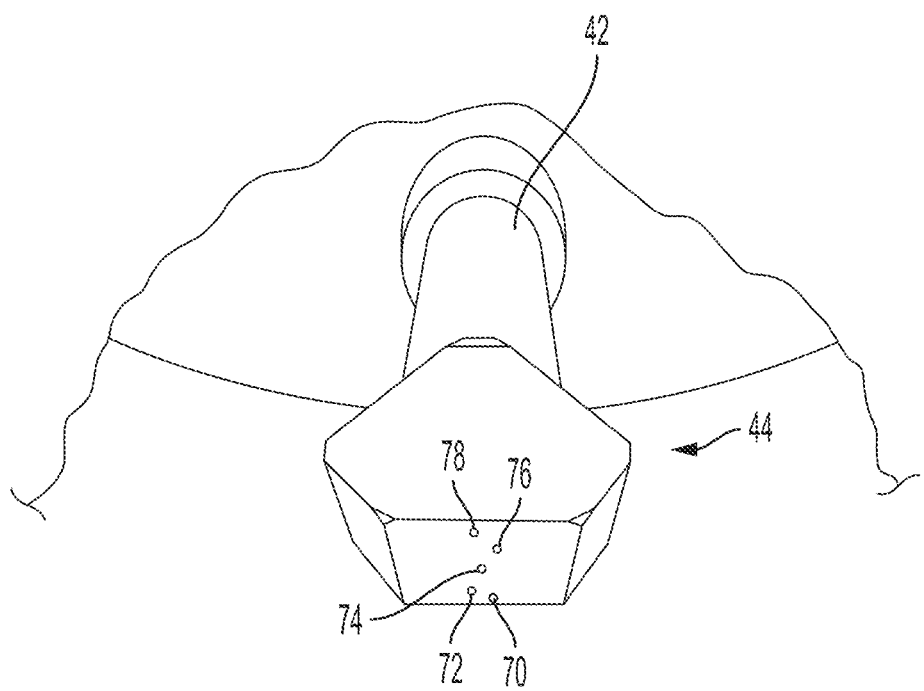
FIG. 12 shows an illustrative diagrammatic underside front view of the liquid applicator assembly shown in FIG. 11.

With reference to FIG. 11, the nozzle apertures 70, 72, 74, 76, 78 are associated with nozzles 80, 82, 84, 86, 88 respectively, and the nozzles are positioned within the fluid applicator head 44 at different angles as follows. The nozzle 84 is positioned perpendicular to the work surface. The nozzle 70 is directed in a machine direction, and the nozzle 78 is directed in a direction opposite the machine direction. The nozzle 72 is directed in a first cross-machine direction, and the nozzle 76 is directed in a second cross-machine direction that is opposite the first cross-machine direction. The nozzle apertures 70, 72, 74, 76, 78 are positioned strategically to provide the desired impingement pattern on the work surface. The multi-directional impingement on the work surface is discussed in more detail below with reference to FIGS. 15 and 16.

Figure 13:
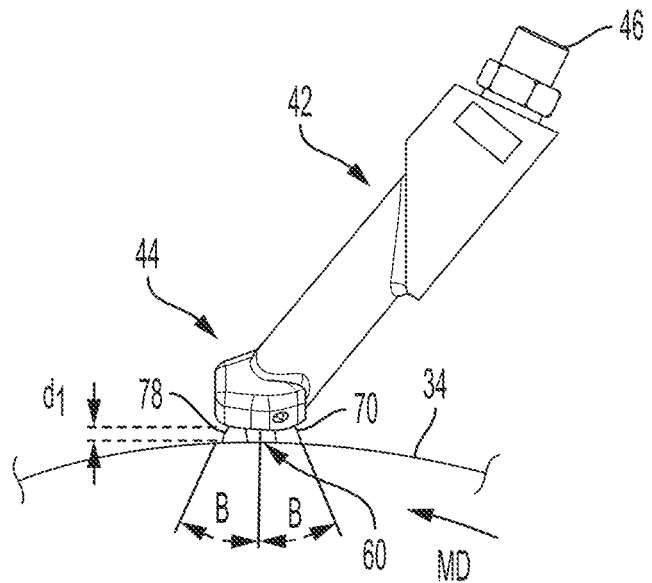
FIG. 13 shows an illustrative diagrammatic side view of the liquid applicator assembly of the cleaning head of FIG. 3.
Figure 14:
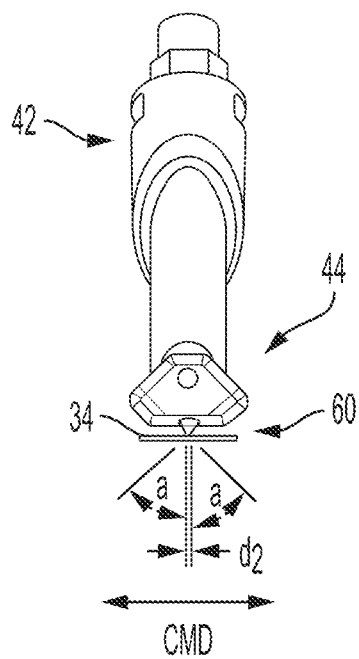
FIG. 14 shows an illustrative diagrammatic front view of the liquid applicator assembly of the cleaning head of FIG. 3.

The cleaning width is kept to a minimum in the cross machine direction on the work surface (e.g., 1 mm, 1.5 mm or 2 mm), and an objective is to clean each individual element (e.g., yarn) in the material from several sides in order to remove even hidden dirt. FIG. 13 shows the fluid applicator assembly 42 including the fluid applicator head 44 positioned above the work surface 34 by a distance $d_1$, of for example, 2 mm, 3 mm or 5 mm, 7.5 mm, 9 mm or 10 mm (e.g., ≤10 mm). The angles of impingement provided by nozzle apertures 70, 78 (shown at β in FIG. 13) may be selectable between 20°-40° in the machine direction. With reference to FIG. 14, the angles of impingement provided by nozzle apertures 72, 76 (shown at α) may be selectable between 25°-45° in cross machine direction respectively, depending on machine clothing design. The range of the cleaning line in the machine direction is shown at $d_2$, and may be, for example, 0.5 mm, 1 mm or 1.5 mm on the work surface. In accordance with an aspect, a minimum of (5) nozzles is required to achieve the 5-directional cleaning jet geometry described above, however additional nozzles could be employed as required for a particular cleaning application (e.g., multiple nozzles in one or more of the 5-directional planes).

Figure 15:
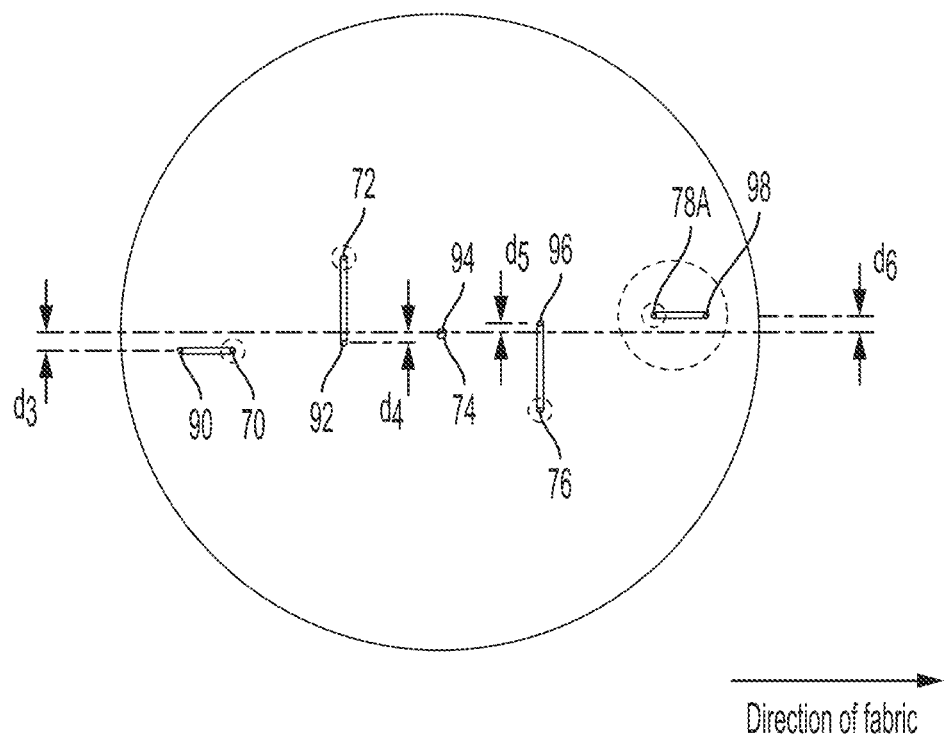
FIG. 15 shows an illustrative diagrammatic detailed layout view of liquid apertures in the liquid applicator assembly of FIG. 3.
Figure 16:
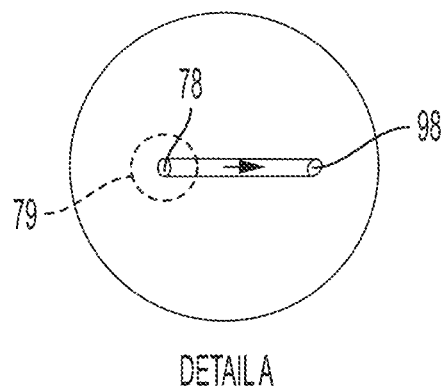
FIG. 16 shows an illustrative diagrammatic enlarged view of a detail portion of the layout of FIG. 15 indicated at detail A therein.

As noted above, the fluid nozzles 80, 82, 84, 86, 88 provide directional fluid discharge at apertures 70, 72, 74, 76, 78 respectively at mutually different angular directions to provide a desired impingement pattern on the work surface in accordance with an aspect of the present invention. In particular, the discharge from the nozzle 80 at aperture 70 impinges the work surface at location 90 in a first direction as shown in FIG. 15 The discharge from the nozzle 88 at aperture 78 impinges the work surface at location 98 in a second direction that is slightly offset from (by $d_3+d_6$) and opposite the first direction. The discharge from the nozzle 82 at aperture 72 impinges the work surface at a location 92 in a third direction, and the discharge from the nozzle 86 at aperture 76 impinges the work surface at a location 96 in a fourth direction that is offset from (by $d_4+d_5$) and opposite the third direction. The discharge from the nozzle 84 at the aperture 74 impinges the work surface at a location 94 that is perpendicular (normal) to the surface of the work surface. The location 94 is offset from the location 92 by $d_4$, and offset from the location 96 by $d_5$. FIG. 16 shows an enlarged view of the aperture 78 (shown at 79) and impingement point 98, showing the direction of impingement. Jet or fan nozzles can be used for the nozzles 70, 72, 74, 76, 78 e.g., with an orifice diameter in the range of 0.2 mm-0.4 mm. The nozzle supply pressure may be typically be in the 100-1000 bar range.

The power of a water jet is dependent on stand-off distance; and also impacted by, among other things, the air knife and vacuum operating properties and geometry. The cleaning head of various aspects of the invention is designed for a stand-off distance of ≤10 mm from each jet to the surface of the fabric or object which is to be cleaned. This generates the maximum amount of the applied energy for cleaning. In this configuration, the jet will not be deflected or diverted, or the energy reduced by the vacuum or air knife. The fluid applicator assembly is designed to prevent the individual water jets from crossing over each other, independent of the distance between the nozzle body and machine clothing. Use of variations of nozzle types are possible.

Figure 17:
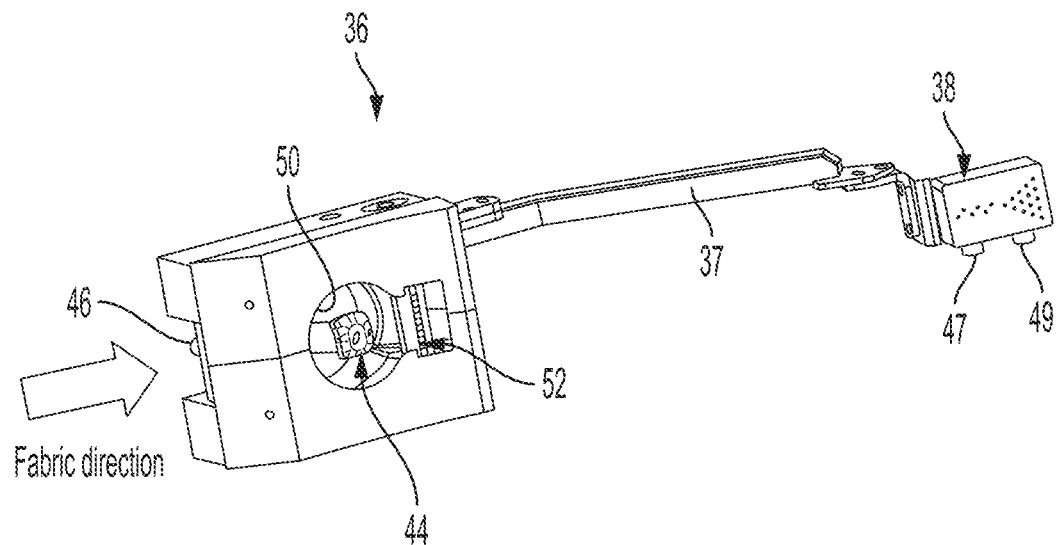
FIG. 17 shows an illustrative diagrammatic underside isometric view of the cleaning head of FIG. 3.
Figure 18:
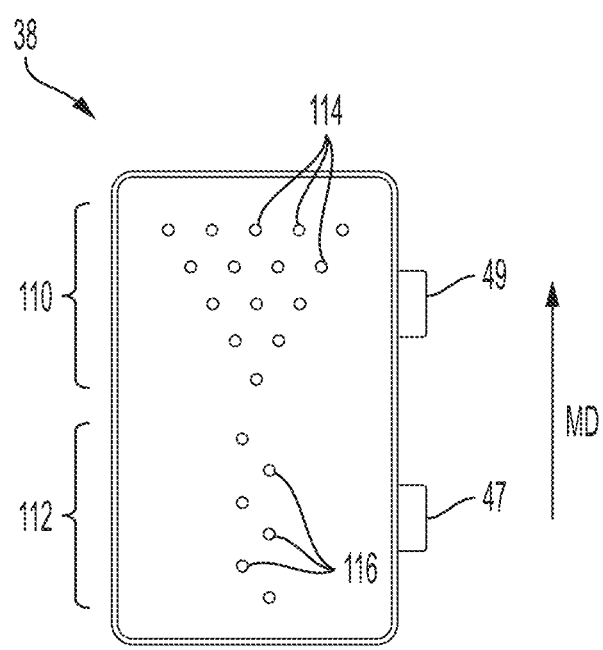
FIG. 18 shows an illustrative diagrammatic detailed layout view of gas apertures in a remote gas applicator assembly of the cleaning head of FIG. 3.

As noted above with reference to FIGS. 3-6, the cleaning head 30 includes an external air knife unit 38, and with reference to FIGS. 17 and 18, the unit 38 includes a first plurality of apertures 114 that form a fan shape in the machine direction (as shown at 110), and a second plurality of apertures 116 that form a stem shape in the machine direction (as shown at 112). Together, the apertures 114, 116 form a generally Y-shaped pattern of apertures. In particular, the individual air knife apertures are specifically arranged in a Y formation (see FIG. 18) in accordance with an aspect of the invention, with the run direction of the machine from the bottom of the "Y-shape" to the top. The second plurality of apertures 112 may include two offset and parallel rows of apertures (the second plurality of apertures 112) that are aligned to the cleaned width of the central unit, and may be designed to blow off most of the water. The following triangular/fan shape (the first plurality of apertures 110) may be designed to blow out any residual water and also to distribute the residual water by the air jet across the width. The number, angle, and diameter of holes in the air knife unit are optimized depending on machine and clothing type. The holes may be angled in CMD and MD if desired for particular applications, similar to the apertures of the internal air doctor 52.

FIG. 19A shows a cleaning head in accordance with another aspect of the invention that includes central unit 36' with an internal vacuum passage 50' and a fluid applicator assembly 42' therein, coupling a fluid applicator head 44' to a fluid source via coupling 46'. The central unit 36' also includes an air doctor assembly 52' with nozzles 100', 102' and 104' (with a fan angle set range of α1) that are coupled to a source of pressurized air at coupling 48'. The components function as discussed above with reference to FIGS. 3-18, and FIG. 19B shows the relative angles of the nozzles 100', 102', 104. The central unit 36' of FIG. 19A however, further includes a second central air knife assembly including nozzles 100" with a fan angle set range of α2 that may be equal and oppositely oriented with respect to the fan angle set range of α1.

Figure 21:
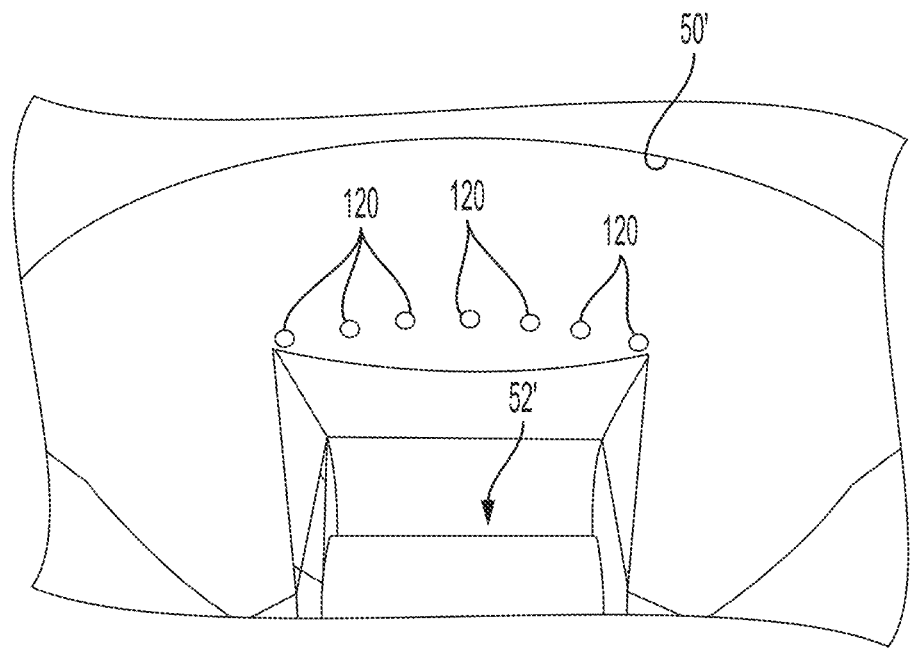
FIG. 21 shows an illustrative diagrammatic enlarged front view of the vacuum chamber lubricant nozzles of FIG. 19A.

The cleaning head 36' may be further fitted with lubrication nozzles 120 (further shown in FIGS. 20 and 21) to prevent adhesion of removed dirt from the walls of the vacuum passage. The internal air knife 100' is equipped with air opening holes at the outlet of the head, and is adjustable in the machine direction, allowing different angles to be set in MD (machine direction) and against MD. Again, the apertures (102', 104') at the edges of the air knife 52' are angled (shown in FIG. 19B) and the apertures 100' are straight in CMD (cross machine direction). With reference again to FIG. 19A, a second air knife assembly including apertures 100" in the cleaning head inlet may optionally be provided (shown at 52"), and the design of the inlet air knife 52" may be the same as the air knife 52' at the outlet, which is similar to that discussed above with reference to FIGS. 8-10.

Figure 22:
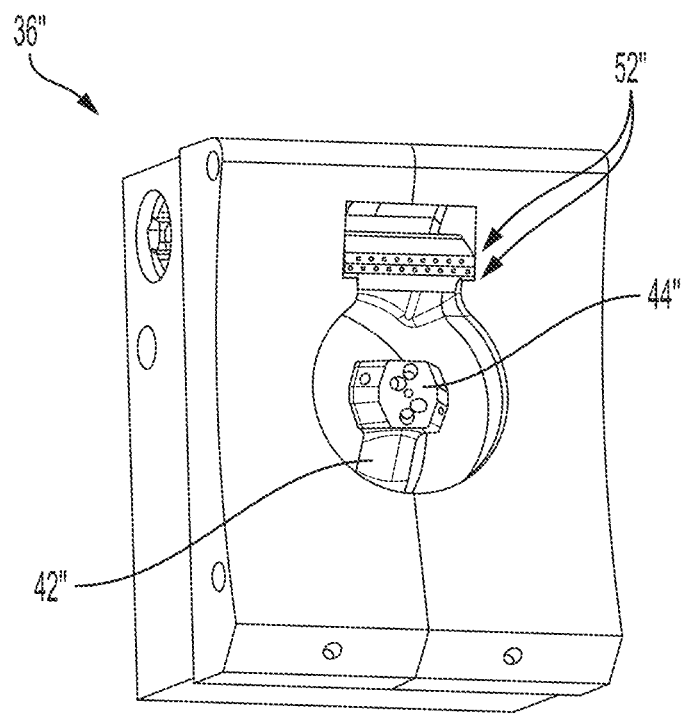
FIG. 22 shows an illustrative diagrammatic underside isometric view of a cleaning head in accordance with a further aspect of the present invention including further nozzle arrangements.

In accordance with further aspects, and with reference to FIG. 22, a central unit 36" of a cleaning head may include a further arrangement and sizing of apertures at a fluid applicator head 44" of a fluid applicator assembly 42", as well as a central air knife doctor assembly 52" that includes two rows of air nozzles.

Those skilled in the art will appreciate that numerous modifications and variations may be made to the above disclosed cleaning head systems without departing from the spirit and scope of the present invention.

What is claimed is:

1. A cleaning head for use in a traversing shower system, said cleaning head comprising a plurality of directional liquid nozzles for discharging a liquid onto a working surface, each directional liquid nozzle being provided along a different direction toward the working surface such that no two directions cross one another between the cleaning head and the working surface,
    wherein the plurality of directional liquid nozzles includes a first directional liquid nozzle in a machine direction of the working surface, a second directional liquid nozzle opposite the machine direction of the working surface, a third directional liquid nozzle in a first cross-machine direction of the working surface, a fourth directional liquid nozzle in a second cross-machine direction opposite the first cross-machine direction of the working surface, and a fifth directional liquid nozzle normal to the working surface.

2. The cleaning head as claimed in claim 1, wherein the plurality of directional liquid nozzles is provided on a working end of a liquid applicator assembly that is positioned at an angle that is neither tangential to nor normal to the working surface.

3. The cleaning head as claimed in claim 1, wherein the liquid includes water.

4. The cleaning head as claimed in claim 1, wherein the cleaning head further includes an extension arm with an external air knife unit attached thereto.

5. The cleaning head as claimed in claim 4, wherein the external air knife unit includes a plurality of air nozzles.

6. The cleaning head as claimed in claim 5, wherein the plurality of air nozzles are provided in a shape that widens in a machine direction of the working surface.

7. The cleaning head as claimed in claim 6, wherein the shape is a generally Y shape.

8. A cleaning head for use in a traversing shower system, said cleaning head comprising:
    a central unit including a central aperture through which vacuum is provided to draw liquid and debris from a working surface;
    at least one forced air nozzle for providing forced air onto the working surface proximate the central aperture; and
    a liquid applicator assembly that extends into the central aperture, said liquid applicator assembly including a plurality of directional liquid nozzles for discharging liquid onto the working surface from at least five different directions,
    wherein the plurality of directional liquid nozzles includes a first directional liquid nozzle in a machine direction of the working surface, a second directional liquid nozzle opposite the machine direction of the working surface, a third directional liquid nozzle in a first cross-machine direction of the working surface, a fourth directional liquid nozzle in a second cross-machine direction opposite the first cross-machine direction of the working surface, and a fifth directional liquid nozzle normal to the working surface.

9. The cleaning head as claimed in claim 8, wherein the liquid includes water.

10. The cleaning head as claimed in claim 8, wherein the cleaning head further includes an extension arm with an external air knife unit attached thereto.

11. The cleaning head as claimed in claim 10, wherein the external air knife unit includes a plurality of air nozzles.

12. The cleaning head as claimed in claim 11, wherein the plurality of air nozzles are provided in a shape that widens in a machine direction of the working surface.

13. The cleaning head as claimed in claim 12, wherein the shape is generally Y shaped.

14. A cleaning head for use in a traversing shower system, said cleaning head comprising:
    a central unit through which forced air and forced liquid are provided to a working surface, and through which a vacuum is provided to draw liquid and debris from the working surface; and
    an extension arm extending from the central unit and including an external air knife unit that includes a plurality of air nozzles in a Y-shaped pattern,
    wherein the plurality of air nozzles includes a first plurality of air nozzles that form a stem of the Y-shaped pattern and a second plurality of air nozzles that form a fan of the Y-shaped pattern.

15. The cleaning head as claimed in claim 14, wherein the first plurality of air nozzles alternate on either side of a center of the Y-shaped pattern.

16. The cleaning head as claimed in claim 14, wherein the cleaning head further includes a liquid applicator assembly that extends into a central aperture of the cleaning head, said liquid applicator assembly including a plurality of directional liquid nozzles for discharging liquid onto the working surface.

17. The cleaning head as claimed in claim 16, wherein the liquid applicator assembly is positioned at an angle that is neither tangential to nor normal to the working surface.

18. The cleaning head as claimed in claim 16, wherein the plurality of directional liquid nozzles includes at least five directional liquid nozzles provided in different directions.

19. The cleaning head as claimed in claim 18, wherein the plurality of directional liquid nozzles includes a directional liquid nozzle that is directed normal to the working surface.

20. The cleaning head as claimed in claim 19, wherein the plurality of directional liquid nozzles includes a first directional liquid nozzle in a machine direction of the working surface, a second directional liquid nozzle opposite the machine direction of the working surface, a third directional liquid nozzle in a first cross-machine direction of the working surface, a fourth directional liquid nozzle in a second cross-machine direction opposite the first cross-machine direction of the working surface, and a fifth directional liquid nozzle normal to the working surface.

21. A cleaning head for use in a traversing shower system, said cleaning head comprising:
- a central unit through which forced air and forced liquid are provided to a working surface, and through which a vacuum is provided from the working surface to draw liquid and debris from the working surface; and
- an extension arm extending from the central unit and including an external air knife unit that includes a plurality of air nozzles in a pattern that widens in a machine direction of the working surface; and
- a liquid applicator assembly that extends into a central aperture of the cleaning head, said liquid applicator assembly including a plurality of directional liquid nozzles for discharging liquid onto the working surface, wherein the plurality of directional liquid nozzles includes at least five directional liquid nozzles, wherein the at least five directional liquid nozzles includes a directional liquid nozzle that is directed normal to the working surface.

22. The cleaning head as claimed in claim 21, wherein the pattern of the plurality of air nozzles for the external air knife unit is a generally Y-shaped pattern.

23. The cleaning head as claimed in claim 22, wherein the plurality of air nozzles includes a first plurality of air knife nozzles that form a stem of the generally Y-shaped pattern and a second plurality of air nozzles that form a fan of the generally Y-shaped pattern.

24. The cleaning head as claimed in claim 23, wherein the first plurality of air nozzles alternate on either side of a center of the Y-shaped pattern.

25. The cleaning head as claimed in claim 21, wherein the liquid applicator assembly is positioned at an angle that is neither tangential to nor normal to the working surface.

26. The cleaning head as claimed in claim 21, wherein the plurality of directional liquid nozzles includes a first directional liquid nozzle in a machine direction of the working surface, a second directional liquid nozzle opposite the machine direction of the working surface, a third directional liquid nozzle in a first cross-machine direction of the working surface, a fourth directional liquid nozzle in a second cross-machine direction opposite the first cross-machine direction of the working surface, and a fifth directional liquid nozzle normal to the working surface.

* * * * *